(12) United States Patent
Wallace

(10) Patent No.: US 12,716,725 B2
(45) Date of Patent: Aug. 25, 2026

(54) SYSTEM AND METHODOLOGY TO PROVIDE AN AUGMENTED VIEW OF AN ENVIRONMENT EXTERNAL TO AN AIRCRAFT DURING FLIGHT

(71) Applicant: Gulfstream Aerospace Corporation, Savannah, GA (US)

(72) Inventor: Matthew Wallace, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 52 days.

(21) Appl. No.: 18/453,073

(22) Filed: Aug. 21, 2023

(65) Prior Publication Data

US 2025/0067561 A1 Feb. 27, 2025

(51) Int. Cl.
*G01C 21/04* (2006.01)
*G06V 20/17* (2022.01)
*G08G 5/74* (2025.01)

(52) U.S. Cl.
CPC ............... *G01C 21/04* (2013.01); *G08G 5/74* (2025.01); *G06V 20/17* (2022.01)

(58) Field of Classification Search
CPC .......... G01C 21/04; G01C 23/00; G08G 5/74; G06V 20/17
USPC .......................................................... 701/514
See application file for complete search history.

(56) References Cited

U.S. PATENT DOCUMENTS 11,869,388 B2 * 1/2024 Robinson ........... G02B 27/0093
11,977,243 B1 * 5/2024 Szczerba ............ G01C 21/3641
2012/0249586 A1 * 10/2012 Wither ............... H04N 1/00323 345/633
2013/0187952 A1 * 7/2013 Berkovich ......... H04N 1/32101 345/633
2018/0218524 A1 * 8/2018 Abalharth ............... G06T 11/60
2020/0351451 A1 * 11/2020 Tillotson .............. H04N 17/002
2021/0357168 A1 * 11/2021 Ball ...................... G06F 3/1423
2022/0051585 A1 * 2/2022 Robinson ................ G06F 3/013
2022/0058875 A1 * 2/2022 LaMountain ...... H04N 21/8545
2022/0223052 A1 * 7/2022 Holmes .................... G08G 5/21
2022/0366615 A1 * 11/2022 Damghanian ............. G06T 7/70
2023/0222786 A1 * 7/2023 Litzau ...................... G08G 5/21 382/104
2024/0010340 A1 * 1/2024 Santos ............... G02B 27/0101
2024/0053609 A1 * 2/2024 Snyder ................... G06V 20/44
2024/0071249 A1 * 2/2024 Shams ..................... G09B 9/36
2024/0203142 A1 * 6/2024 De Mers ................. G01S 17/89
2024/0241391 A1 * 7/2024 Seder ...................... G06F 3/017
(Continued)

*Primary Examiner* — Krishnan Ramesh
(74) *Attorney, Agent, or Firm* — Ingrassia Fisher & Lorenz, LLP

(57) ABSTRACT

Disclosed here are an aircraft, a system, and methods of processing video content displayed onboard an aircraft during flight. A disclosed embodiment of the method obtains position data corresponding to current geographical position of the aircraft, attitude data corresponding to current attitude of the aircraft, and video data for a live video feed corresponding to a view of an environment external to the aircraft. The received video data is processed into augmented video output data, based on the position data, the attitude data, and geospatial data related to at least some geographical features in the view of the environment. Augmented video content is presented on a display device onboard the aircraft, wherein the augmented video content corresponds to the augmented video output data.

20 Claims, 8 Drawing Sheets

(56) References Cited

U.S. PATENT DOCUMENTS

| | | | | |
|---|---|---|---|---|
| 2024/0304103 | A1* | 9/2024 | Robinson | G09B 9/32 |
| 2024/0327027 | A1* | 10/2024 | Mackie | B64D 43/00 |
| 2024/0355058 | A1* | 10/2024 | Wu | G06T 19/003 |
| 2024/0371114 | A1* | 11/2024 | Souiai | G06T 7/80 |
| 2025/0054103 | A1* | 2/2025 | Correa, Jr. | G06T 5/50 |

* cited by examiner

SYSTEM AND METHODOLOGY TO PROVIDE AN AUGMENTED VIEW OF AN ENVIRONMENT EXTERNAL TO AN AIRCRAFT DURING FLIGHT

TECHNICAL FIELD

Embodiments of the subject matter described herein relate generally to vehicle display and entertainment systems. More particularly, embodiments of the subject matter relate to a system onboard an aircraft that generates an augmented display of an environment external to the aircraft during flight.

BACKGROUND

A vehicle (such as an aircraft) may include one or more body-mounted cameras that capture a live video feed of the outside environment. The captured video content can be presented to passengers or members of an aircraft crew inside the aircraft cabin. For example, a real-time view of the sky, the terrain, geography, and/or landmarks can be rendered on one or more displays that are provided for passenger viewing. Alternatively or additionally, the captured video content could be utilized by an operator of the vehicle, e.g., a pilot or co-pilot of an aircraft.

It is desirable to provide an improved or enhanced viewing experience for occupants of a vehicle, such as passengers of an aircraft. Furthermore, other desirable features and characteristics will become apparent from the subsequent detailed description and the appended claims, taken in conjunction with the accompanying drawings and the foregoing technical field and background.

BRIEF SUMMARY

The following includes a description of an embodiments of an aircraft that includes: an avionics subsystem to provide position data corresponding to current geographical position of the aircraft, and attitude data corresponding to current attitude of the aircraft; an imaging system to capture video data corresponding to a view of an environment external to the aircraft; and at least one video processor coupled to the avionics subsystem and the imaging system. The at least one video processor is configured to process the video data captured by the imaging system into augmented video output data, wherein the at least one video processor generates the augmented video output data based on the position data provided by the avionics subsystem, the attitude data provided by the avionics subsystem, and geospatial data related to at least some geographical features in the view of the environment. The aircraft also includes a display device coupled to the at least one video processor to receive the augmented video output data, the display device configured to display augmented video content corresponding to the received augmented video output data.

Also disclosed here is a method of processing video content displayed onboard an aircraft during flight. Embodiments of the disclosed method involve: obtaining position data corresponding to current geographical position of the aircraft; obtaining attitude data corresponding to current attitude of the aircraft; receiving video data for a live video feed corresponding to a view of an environment external to the aircraft; processing the received video data into augmented video output data, based on the obtained position data, the obtained attitude data, and geospatial data related to at least some geographical features in the view of the environment; and causing presentation of augmented video content with a display device onboard the aircraft, wherein the augmented video content corresponds to the augmented video output data.

Also disclosed here is an embodiment of a system that includes: at least one processor; and at least one processor-readable medium associated with the at least one processor, the at least one processor-readable medium storing processor-executable instructions configurable to be executed by the at least one processor to perform a method of processing video content for display onboard an aircraft during flight. Embodiments of the method involve: obtaining position data corresponding to current geographical position of the aircraft; obtaining attitude data corresponding to current attitude of the aircraft; receiving video data for a live video feed corresponding to a view of an environment external to the aircraft; processing the received video data into augmented video output data, based on the obtained position data, the obtained attitude data, and geospatial data related to at least some geographical features in the view of the environment; and causing presentation of augmented video content with a display device onboard the aircraft, wherein the augmented video content corresponds to the augmented video output data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
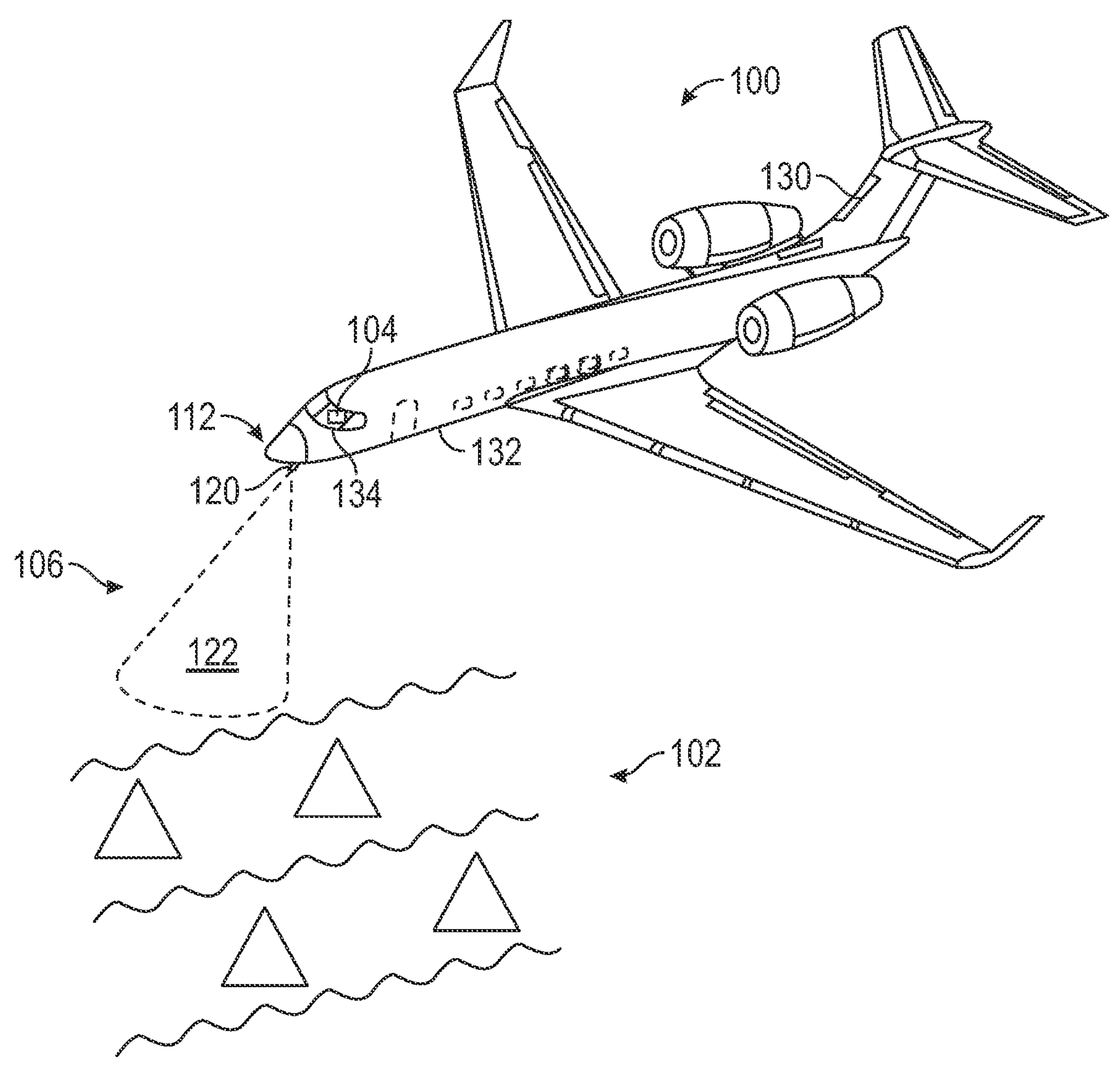
FIG. 1 is a diagram that depicts an aircraft flying above geographical features.

The following detailed description is merely illustrative in nature and is not intended to limit the embodiments of the subject matter or the application and uses of such embodiments. As used herein, the word “exemplary” means “serving as an example, instance, or illustration.” Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, or the like, various elements of the systems and devices described herein are essentially the code segments or instructions that cause one or more processor devices to perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to vehicle control and navigation systems, vehicle display systems (including aircraft cabin display systems), vehicle instrumentation systems, the processing of image data, virtual and augmented reality systems and methodologies, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A vehicle-based display system and related operating methodologies are disclosed herein. In accordance with certain non-limiting embodiments, the system is deployed onboard an aircraft such as an airplane. However, it should be appreciated that embodiments of the disclosed system can be utilized for other vehicle applications including, without limitation: trains; helicopters; automobiles; watercraft; monorails; amusement park rides; transportation systems; ski lifts; or the like.

FIG. 1 is a diagram that depicts an exemplary embodiment of an aircraft 100 flying above geographical features 102 (which may be natural terrain, man-made structures, landmarks, or anything that might be visible from a vantage point of the aircraft 100). The aircraft 100 includes or cooperates with one or more onboard aircraft systems 104, which may include, without limitation, any of the following in combination and in any number of iterations or multiples: a flight control system; a navigation system; an avionics subsystem; an instrumentation system; a display device; an imaging system that includes one or more cameras; an image/video processing system; an alerting system; a messaging or notification system for the flight crew; a global positioning system (GPS) receiver; various sensor devices or components. In certain embodiments, the onboard aircraft systems 104 include one or more components or subsystems that cooperate to process and display augmented video content. For example, the onboard aircraft systems 104 may include or cooperate with the items included with the exemplary system configuration depicted in FIG. 2. Although FIG. 1 represents the various onboard aircraft systems 104 as a single block, it should be understood that an embodiment of the aircraft 100 will implement the onboard aircraft systems 104 with a variety of different physical, logical, and computer-implemented components.

The depicted embodiment of the aircraft 100 includes external structure 112 that defines the exterior of the aircraft 100. The aircraft 100 includes an imaging system having any number of cameras mounted to or integrated with the external structure 112. Each camera is mounted, configured, and oriented in a particular manner to enable it to capture video data corresponding to a view of an environment external to the aircraft 100. In this regard, the depicted embodiment of the aircraft includes a camera 120 that can be operated to capture an unobstructed view of the environment 106 that resides below the nose of the aircraft 100. FIG. 1 schematically illustrates the camera 120 capturing image data that encompasses a zone 122 underneath the external structure 112. The zone 122 captured by the camera 120 may include some of the geographical features 102.

The aircraft 100 may include any number of additional or alternative cameras 120 mounted at any desired location. For example, an embodiment of the aircraft 100 may include any or all of the following, without limitation: a camera 120 located on the vertical stabilizer 130 and generally oriented in the forward direction; a camera 120 located on the vertical stabilizer 130 and generally oriented in the aft direction; a camera 120 located on the belly section 132 and generally oriented in a downward and forward direction; a camera 120 located on the belly section 132 and generally oriented in a downward and aft direction; a camera 120 that is positioned to capture a “pilot’s eye” view from the perspective of the windshield 134; a wingtip camera 120 that is positioned at or near a wingtip of the aircraft and generally oriented forward and toward the fuselage of the aircraft. A system onboard the aircraft 100 (such as a cabin management system, a mobile app, a passenger entertainment system, or the like) can be used to select or configure parameters related to the camera(s) 120. For example, a user onboard the aircraft can interact with an appropriate system or app to: select a particular camera view; choose a multi-camera display; control camera options (if supported, e.g., zoom setting, tilt control, panning, wide angle lens settings, etc.); enable/disable the camera display.

A camera 120 used for the system and methodology described here may be fixed in one position corresponding to a single viewing perspective, or it may be movable in one or more dimensions (e.g., tilt, pan, roll, height) and controllable by a user onboard the aircraft 100. A camera 120 used for the system and methodology described here may be configured to capture a single view, or it may be configured as a multiple-element or multi-lens camera to capture a plurality of different views, a plurality of different focal points, or the like. In this regard, a camera 120 can be suitably configured to capture stereoscopic images to support three-dimensional presentation effects. Moreover, a camera 120 can be outfitted with a fixed lens or an adjustable zoom lens, which can be controlled by a user onboard the aircraft 100. The options and settings described here, and other features utilized with modern video cameras can be leveraged for use with the system described here.

In practice, the aircraft 100 may include several external facing cameras 120 that provide views of the aircraft, terrain, and surrounding environment. While such real-time camera feeds can be entertaining and informative in certain situations (e.g., during takeoff and landing, while passing interesting landmarks, etc.), they may not be as useful or interesting at night, while the aircraft 100 is flying at high altitude, or while the aircraft 100 is flying over the ocean, through clouds, or over uninteresting landscape. With the application of modern 3D graphics combined with real-time position and attitude information for the aircraft 100, dynamic computer-generated images can be composited into the content provided by real-time cameras. Accordingly, a system of the type described here can add informative and entertaining visual elements that appear as part of the environment captured by the cameras 120. For example, the system can generate and render identifiers that float over landmarks, generate and render 3D infographics that move with and around surfaces of the host aircraft 100 and/or that move with and around features that are present in the surrounding environment (e.g., buildings, terrain features, roads, trees, or the like).

Figure 2:
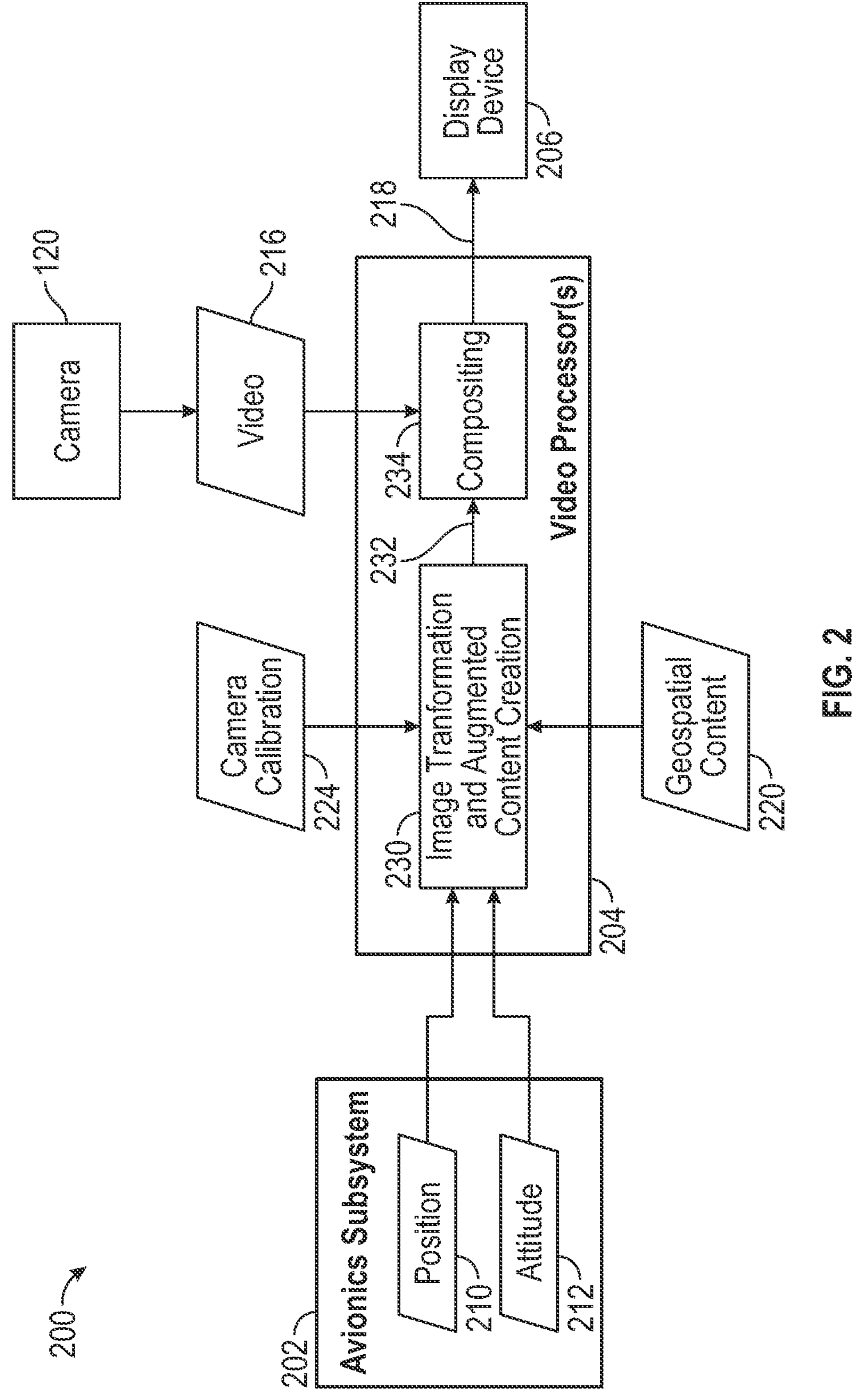
FIG. 2 is a simplified block diagram representation of a system onboard an aircraft that is configured in accordance with certain embodiments of the invention to process and present augmented video content during operation of the aircraft.

FIG. 2 is a simplified block diagram representation of a system 200 onboard an aircraft. The system 200 is configured in accordance with certain embodiments of the invention to process and present augmented video content during operation of the aircraft. FIG. 2 depicts various systems and components that may be onboard the aircraft 100 shown in FIG. 1. Indeed, the onboard aircraft systems 104 shown in FIG. 1 may include any or all of the components depicted in FIG. 2. The illustrated embodiment of the system 200 includes, without limitation: an avionics subsystem 202; an imaging system including at least one camera 120; at least one video processor 204; and a display device 206. A deployed implementation of the system 200 may include some or all of these components, additional systems and components (as needed or desired), and/or alternative systems and components (as needed or desired). FIG. 2 is merely an illustrative example that depicts certain systems and components that support the inventive subject matter described herein.

The avionics subsystem 202 is suitably configured and operated to provide status information or data related to the current real-time operating condition of the host aircraft. In accordance with certain embodiments, the avionics subsystem 202 provides position data 210 corresponding to the current geographical position of the aircraft, and provides attitude data 212 corresponding to the current attitude of the aircraft. The avionics subsystem 202 may include or cooperate with a suitably configured navigation, geolocation, or tracking system that generates the position data 210. In certain implementations, a GPS or equivalent geolocation system can be leveraged to provide the position data 210. The attitude data 212 includes data associated with the pitch, roll, and yaw status of the aircraft 100. In this regard, the avionics subsystem 202 may include or cooperate with an inertial reference system onboard the aircraft 100, which can utilize any number of sensors, an inertial measurement unit, or the like. As schematically depicted in FIG. 2, the position data 210 and the attitude data 212 are provided to the video processor(s) 204 in an ongoing manner or otherwise as needed.

As mentioned previously, the system 200 may include at least one camera 120 that captures and provides video data 216 corresponding to a view of the environment outside the aircraft. For simplicity and ease of description, FIG. 2 only shows one camera 120 that provides respective video data 216 to the video processor(s) 204 in an ongoing manner or otherwise as needed. The original video data 216 can be processed and modified into augmented video output data 218 in the manner described in more detail below. The display device 206 is coupled to (or could be integrated with) the video processor(s) 204 to receive the augmented video output data 218. The display device 206 functions in a conventional manner to display augmented video content that corresponds to the received augmented video output data 218. The display device 206 can be implemented and deployed in various ways onboard the aircraft. To this end, the display device 206 may be realized as: a common stand-alone monitor (mounted to an interior panel, bulkhead, fixture, or cabinet); a display integrated into a seat back or a headrest; a retractable drop-down or slide-out display element; a transparent or translucent film display; or the like.

The at least one video processor 204 is coupled to the avionics subsystem 202 to obtain the position data 210 and the attitude data 212, and is coupled to the camera 120 to obtain the video data 216. The video processor(s) 204 is configured to process the incoming video data 216 (that is captured by the camera 120) into the augmented video output data 218, wherein the augmented video output data 218 represents a modified, supplemented, or enhanced version of the original video data 216. More specifically, the video processor(s) 204 generates the augmented video output data 218 based on at least the following information: the position data 210 provided by the avionics subsystem 202; the attitude data 212 provided by the avionics subsystem 202; geospatial data 220 that relates to at least some of the geographical features present in the current view of the environment (as captured by the camera 120); and calibration data 224 for the imaging system or camera 120 that is used to capture the original video data 216.

The geospatial data 220 defines or represents visual or graphical content that is somehow associated with features, items, or elements that are conveyed by the captured video data 216. The geospatial content conveyed by the geospatial data 220 can be used to modify, augment, or enhance the original video data 216 such that the resulting augmented video output data 218 contains visual content from the scene captured by the camera 120 blended with visual content corresponding to at least some of the geospatial data 220. In certain embodiments, the geospatial data 220 includes or is realized as metadata, such that the augmented video content presented by the display device 206 includes visual content corresponding to at least some of the metadata. Although the type, contextual meaning, and character of the metadata can vary from one implementation to another, exemplary embodiments may be compatible with any or all of the following metadata, without limitation: data that identifies, describes, or characterizes a geographical feature that appears in the view of the environment; data that identifies, describes, or characterizes an architectural feature that appears in the view of the environment; data that identifies, describes, or characterizes weather associated with the view of the environment; data that identifies, describes, or characterizes religious information associated with the view of the environment; and/or data that identifies, describes, or characterizes a person, a sports team, an organization, a company, a business, an object, an entity, a geo-political boundary, a historically significant location, or a culturally significant location that appears in the view of the environment.

The camera calibration data 224 is associated with image capturing characteristics, optical characteristics, and/or configuration settings of the camera 120 that serves as the source of the original video data 216. The video processor(s) 204 utilizes the calibration data 224 to create augmented image/video content that accurately matches or blends with the appearance of the video content conveyed by the original video data 216. To this end, the camera calibration data 224 may include or be realized as any of the following, without limitation: the current (or fixed) location of the camera 120 relative to a reference point, plane, or position on the host aircraft; the current (or fixed) orientation of the camera 120 relative to a reference point, plane, or position on the host aircraft; the current (or fixed) "line of sight" of the camera 120, which may be represented by any coordinate system relative to a reference point, plane, or position on the host aircraft; a measurement or metric related to the quality or clarity of the lens used by the camera 120; a measurement or metric related to the presence of visual artifacts or distortion introduced by the camera 120 and/or a lens of the camera 120; a measurement or metric of coloration introduced by the camera 120; a measurement or metric related to the spectrum of light that is captured (e.g., to accommodate an infrared camera implementation).

The at least one video processor 204 may include any combination of software, firmware, hardware, etc. For example, the video processor(s) 204 may include an application specific integrated circuit (ASIC), an electronic circuit, a microprocessor device and memory that executes one or more software or firmware programs, a combinational logic circuit, and/or other suitable components that provide the described functionality. In accordance with certain embodiments, the at least one video processor 204 performs tasks related to image transformation and augmented content creation 230 to generate supplemental video content 232 in response to the real-time position data 210, the real-time attitude data 212, the camera calibration data 224, and corresponding geospatial data 220 that is relevant to the external environment. The at least one video processor 204 also performs tasks related to video compositing 234, which combines at least some of the content from the original video data 216 with at least some of the supplemental video content 232 to arrive at the augmented video output data 218. Although not separately depicted in FIG. 2, the at least one video processor 204 may be suitably configured and operated to perform additional or alternative image or video processing routines or tasks on the original video data 216 and/or on content that is associated with the geospatial data 220.

Figure 3:
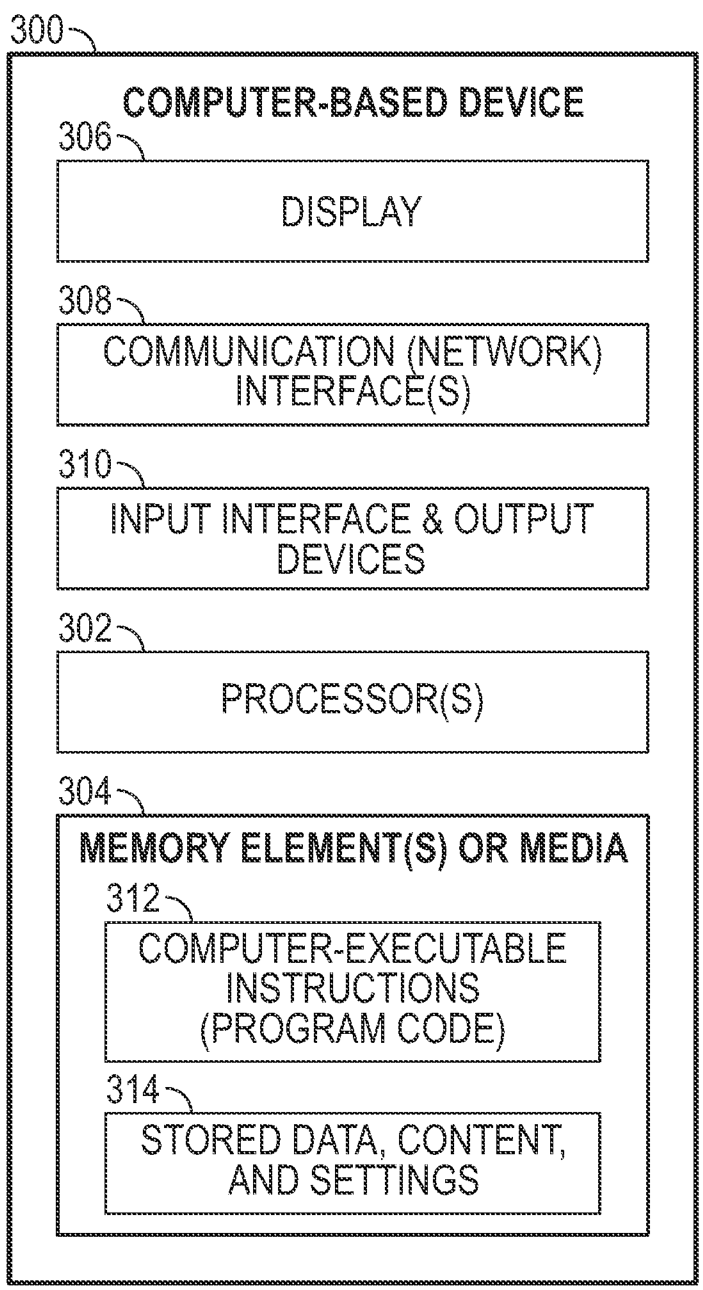
FIG. 3 is a block diagram of an exemplary embodiment of a computer-based device.

In accordance with certain embodiments, an aircraft system 104 depicted in FIG. 1, and one or more of the items depicted in FIG. 2 can be implemented as at least one computer-based or processor-based device, system, or piece of equipment. In this regard, FIG. 3 is a simplified block diagram representation of an exemplary embodiment of a computer-based device 300, which may be used to implement certain devices or systems onboard the aircraft 100.

The device 300 generally includes, without limitation: at least one processor 302; at least one memory storage device, storage media, or memory element 304; a display 306; at least one communication (network) interface 308; and input and output (I/O) devices 310, such as an input interface, one or more output devices, one or more human/machine interface elements, or the like. In practice, the device 300 can include additional components, elements, and functionality that may be conventional in nature or unrelated to the particular application and methodologies described here.

A processor 302 may be, for example, a central processing unit (CPU), a field programmable gate array (FPGA), a microcontroller, an application specific integrated circuit (ASIC), or any other logic device or combination thereof. One or more memory elements 304 are communicatively coupled to the at least one processor 302, and can be implemented with any combination of volatile and non-volatile memory. The memory element 304 has non-transitory machine-readable and computer-executable instructions (program code) 312 stored thereon, wherein the instructions 312 are configurable to be executed by the at least one processor 302 as needed. When executed by the at least one processor 302, the instructions 312 cause the at least one processor 302 to perform the associated tasks, processes, and operations defined by the instructions 312. Of course, the memory element 304 may also include instructions associated with a file system of the host device 300 and instructions associated with other applications or programs. Moreover, the memory element 304 can serve as a data storage unit for the host device 300. For example, the memory element 304 can provide storage 314 for aircraft data, navigation data, sensor data, measurements, image and/or video content, settings or configuration data for the aircraft, and the like.

The display 306 (if deployed with the particular embodiment of the device 300) may be integrated with the device 300 or communicatively coupled to the device 300 as a peripheral or accessory component. The shape, size, resolution, and technology of the display 306 will be appropriate to the particular implementation of the device 300. The display 306 can be realized as a monitor, touchscreen, or another conventional electronic display that is capable of graphically presenting data and/or information provided by the device 300.

The communication interface 308 represents the hardware, software, and processing logic that enables the device 300 to support data communication with other devices. In practice, the communication interface 308 can be suitably configured to support wireless and/or wired data communication protocols as appropriate to the particular embodiment. For example, the communication interface 308 can be designed to support an aircraft network protocol, a cellular communication protocol, a short-range wireless protocol (such as the BLUETOOTH communication protocol), and/or a WLAN protocol. As another example, if the device 300 is a desktop or laptop computer, then the communication interface can be designed to support the BLUETOOTH communication protocol, a WLAN protocol, and a LAN communication protocol (e.g., Ethernet). In accordance with certain aircraft applications, the communication interface 308 is designed and configured to support one or more onboard network protocols used for the communication of information between devices, components, and subsystems of the aircraft 100.

The I/O devices 310 enable the user of the device 300 to interact with the device 300 as needed. In practice, the I/O devices 310 may include, without limitation: an input interface to receive data for handling by the device 300; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 306 can be categorized as an I/O device 310. Moreover, a touchscreen display 306 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

Figure 4:
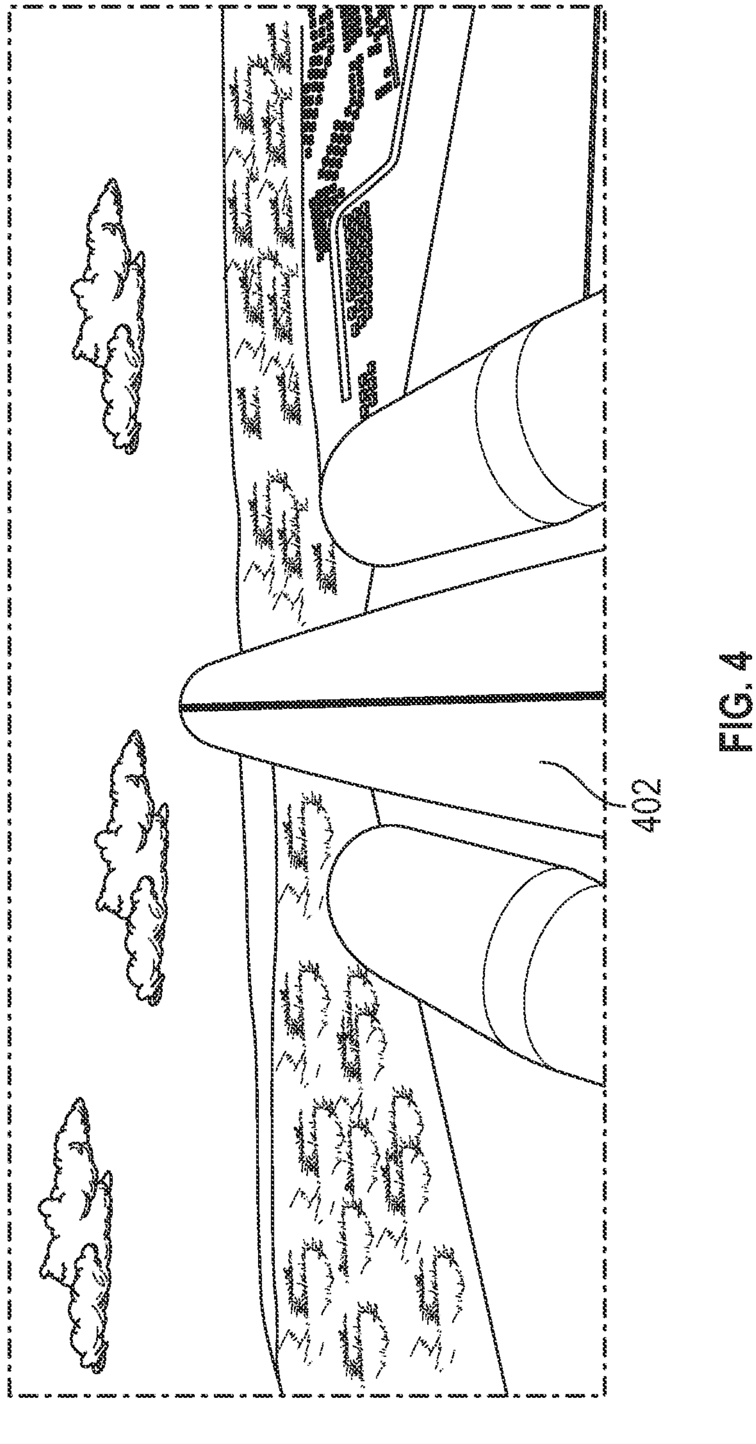
FIG. 4 depicts image content of a live video feed captured by a forward-facing camera mounted to the vertical stabilizer of an aircraft.
Figure 5:
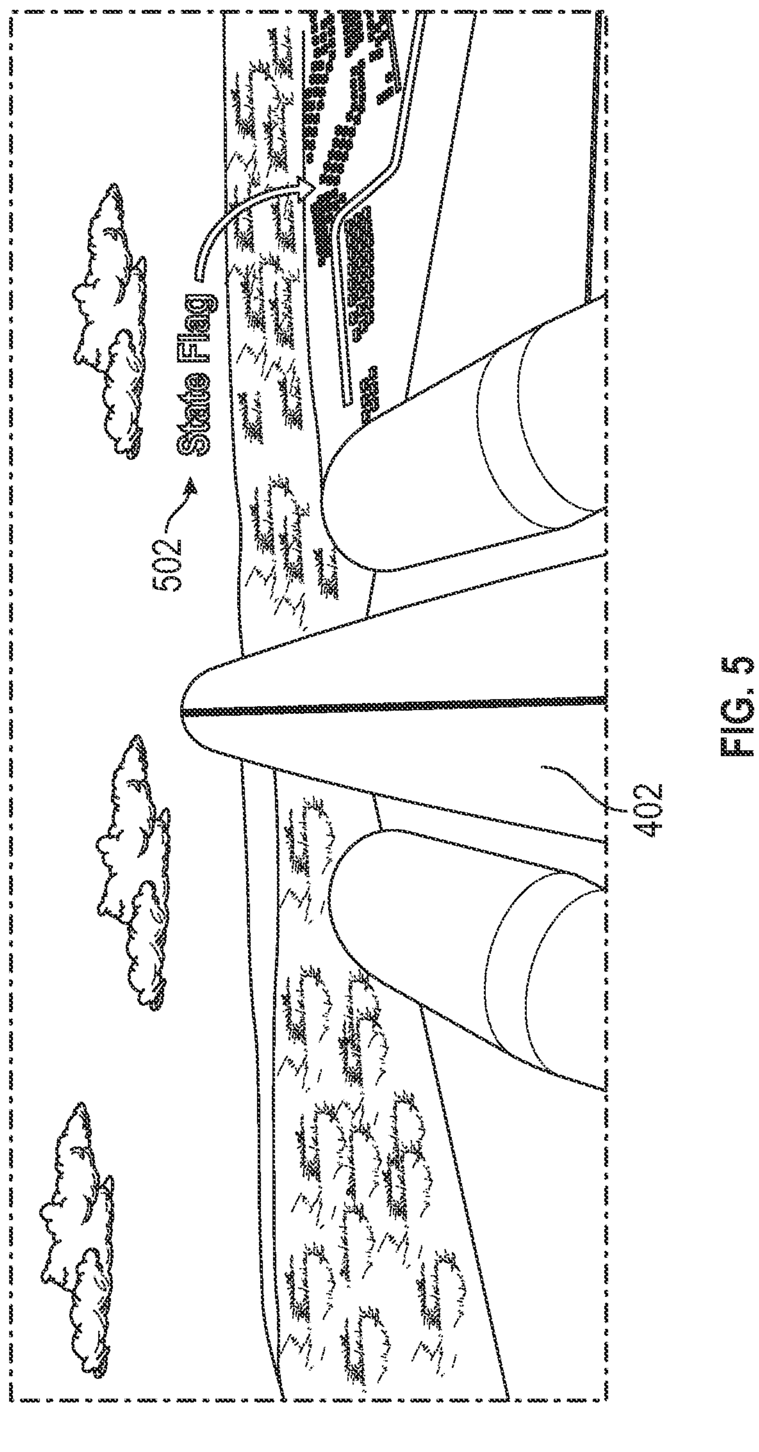
FIG. 5 depicts an augmented version of the image content shown in FIG. 4.

As mentioned above, the system 200 is configured and operated in an appropriate manner to process and generate augmented video content that corresponds to a current view of the environment outside of the host aircraft. In this regard, FIG. 4 depicts image content 400 of a live video feed captured by a forward-facing camera mounted to the vertical stabilizer of an aircraft 402 (a portion of which appears in the field of view). The image content 400 corresponds to a particular moment in time captured by the live video feed, as conveyed by the original video data obtained by the forward-facing camera. In contrast, FIG. 5 depicts augmented image content 500 that represents an augmented version of the image content 400. In this example, the augmented image content 500 includes all of the original image content as captured by the forward-facing camera, combined with at least one visible supplemental feature 502. As explained above with reference to FIG. 2, certain visual characteristics of the at least one visible supplemental feature 502 (e.g., the shape, size, contextual meaning, orientation, alignment, perspective, position within the field of view) are influenced or determined by the position data 210, the attitude data 212, the geospatial data 220, and the camera calibration data 224. For this particular non-limiting example, the at least one visible supplemental feature 502 is an icon, graphic, or text label that describes or identifies a landmark that is visible within the field of view of the original image content 400. For the sake of simplicity, the augmented image content 500 depicted in FIG. 5 contains only one visible supplemental feature 502 (which identifies a state flag). In practice, any number of discrete supplemental features 502 may be shown as augmented content.

Figure 6:
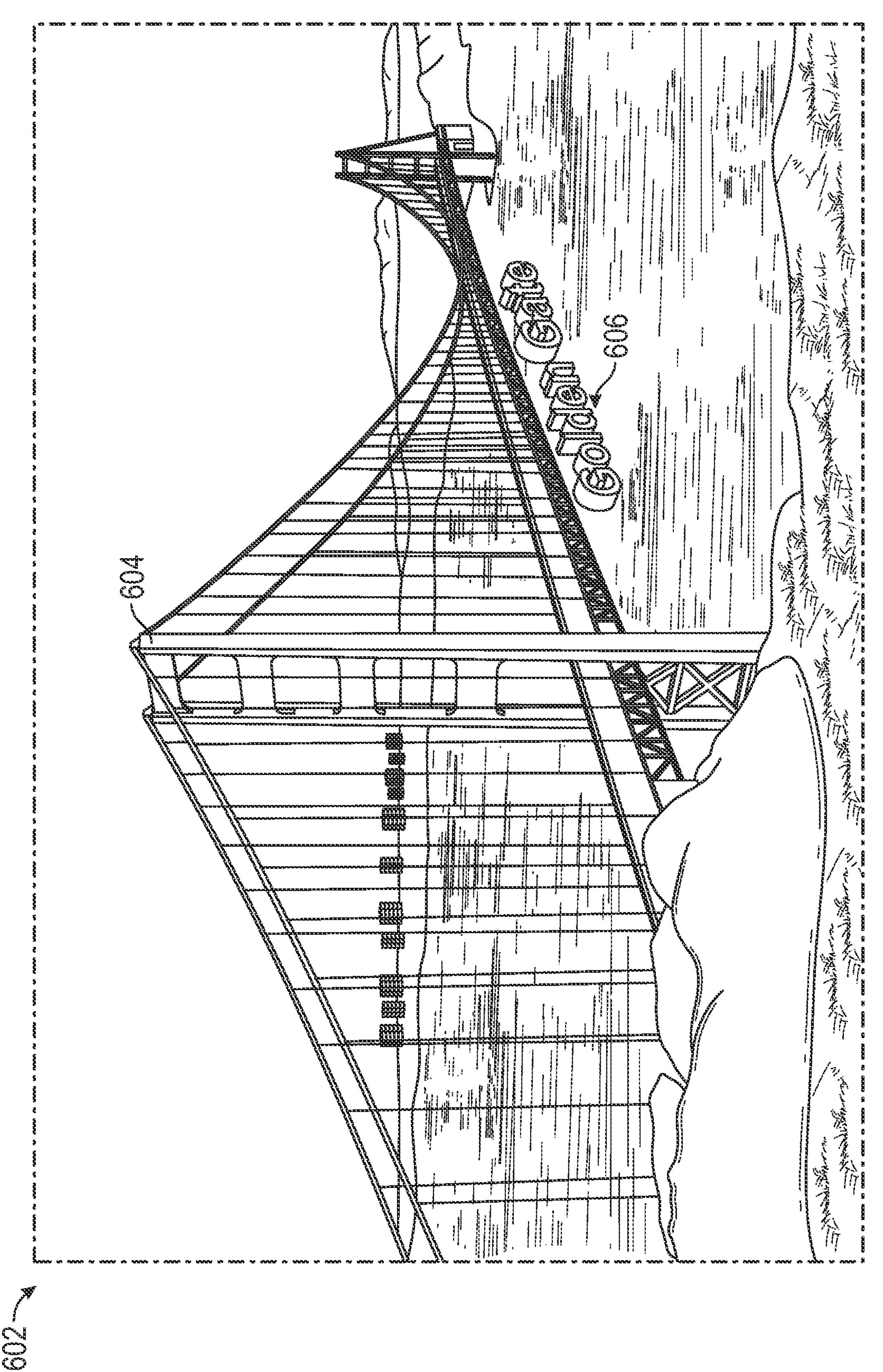
FIG. 6 depicts augmented image content that includes an image of a bridge captured by a camera of an aircraft in flight under first operating conditions.
Figure 7:
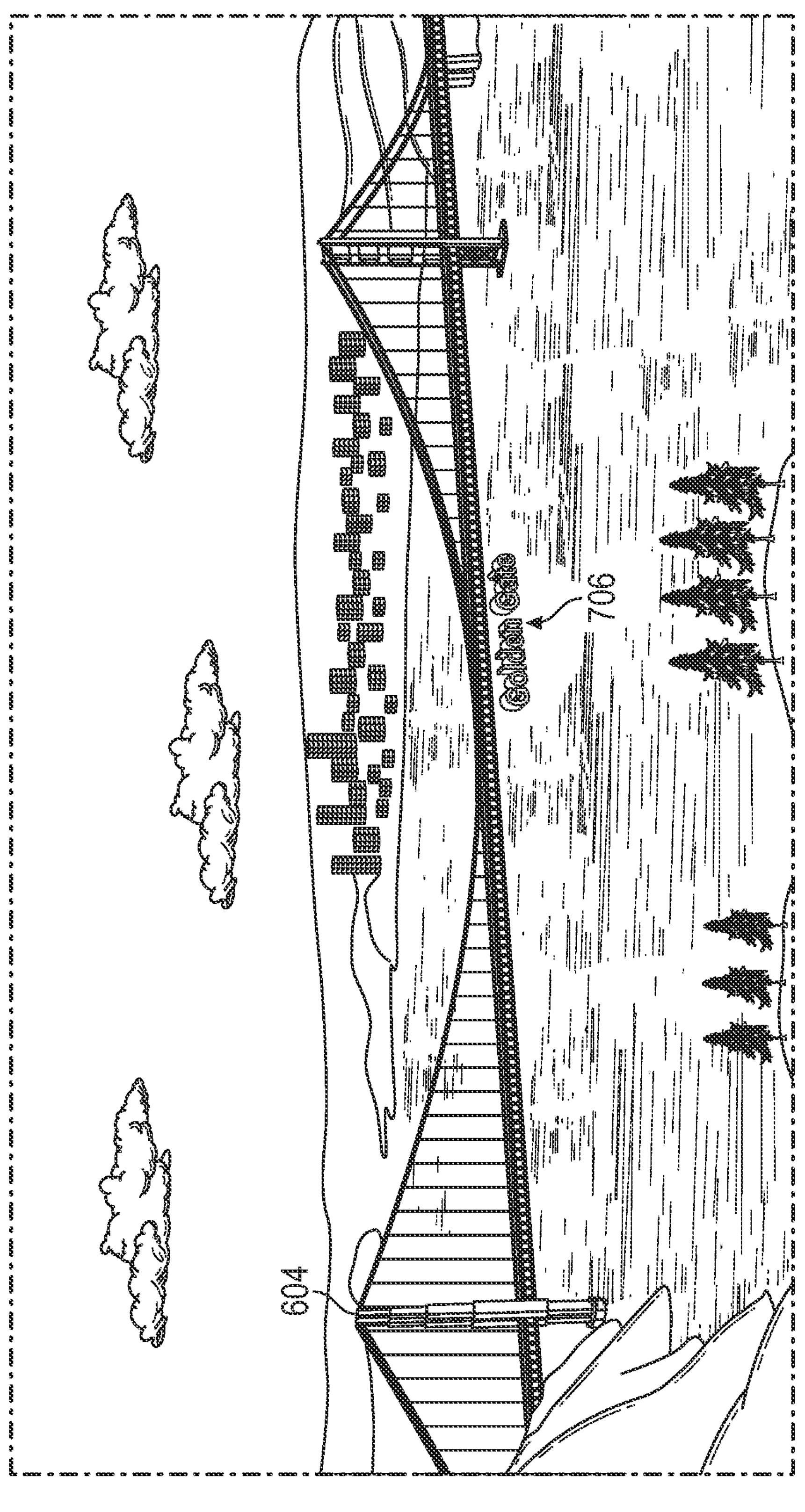
FIG. 7 depicts augmented image content that includes an image of the bridge shown in FIG. 6, as captured by the camera of the aircraft in flight under second operating conditions.

As another non-limiting example, FIG. 6 depicts augmented image content 602 that includes an image of a bridge 604 captured by a camera of an aircraft in flight under first operating conditions. In contrast, FIG. 7 depicts augmented image content 702 that includes an image of the bridge 604, as captured by the camera of the aircraft in flight under second operating conditions. The augmented image content 602 includes a visible supplemental feature 606 in the form of an identifying label that is linked to the bridge 604: GOLDEN GATE. The augmented image content 702 also includes a visible supplemental feature 706 in the form of an identifying label that is linked to the bridge 604: GOLDEN GATE. Although the text content and contextual meaning of the supplemental features 606, 706 are the same, the visual appearance and displayed characteristics are distinguishable due to the different operating conditions of the host aircraft, which results in different points of view for the aircraft camera. For example, the shape, size, and 3D perspective of the letters used with the visible supplemental feature 606 are visually distinguishable from that used with the visible supplemental feature 706.

In certain embodiments, descriptive labels, icons, or other supplemental visual content can be removed from the augmented video content at an appropriate time, e.g., when the associated landmark or feature becomes too small to distinguish, when more popular or important visible features take precedent, or when the associated landmark or feature begins to leave the field of view. The system and methodology described here dynamically updates the visual appearance of such augmented image content in an ongoing manner in response to changes in the camera's orientation, where such changes are influenced by the current position and attitude of the aircraft. Accordingly, visible supplemental features can be generated in an appropriate manner for inclusion in augmented video content, and in a way that maintains visual consistency with the original video content captured by the camera.

FIGS. 5-7 are intended to demonstrate how supplemental or additional graphical content can be combined with the original video content to generate augmented video content for presentation to a user onboard the aircraft. In certain embodiments, the supplemental information corresponds to geospatial data linked to features, elements, landmarks, and/or environmental conditions that appear in the original video feed. Accordingly, the augmented video content may contain graphics associated with: geographical features (e.g., natural or man-made lakes, waterways, hills, mountains, parks, landscape, trees, beaches); architectural features (e.g., buildings, roads, bridges, equipment); weather conditions, weather patterns, or environmental conditions (e.g., clouds, storm fronts, hurricanes, rain, snow, tidal features). The augmented video content may also contain graphics associated with people, sports teams, organizations, businesses, companies, objects, entities, geo-political boundaries, historical or culturally significant locations, religious information such as prayer direction, or anything that might have a contextual relationship with geospatial content. In certain embodiments, the augmented video content includes or is rendered as three dimensional graphical content that corresponds to at least some of the retrieved geospatial data (alternatively or additionally, two dimensional content can also be placed into a rendered scene). The augmented video content may also contain graphics, text, or other graphical content associated with the flight status, operating condition, or performance of the host aircraft, including, without limitation: airspeed; acceleration; altitude; geographic location (latitude, longitude); flight plan; flight trajectory; bank angle; destination airport; waypoints; or current operating status data of the aircraft.

Figure 8:
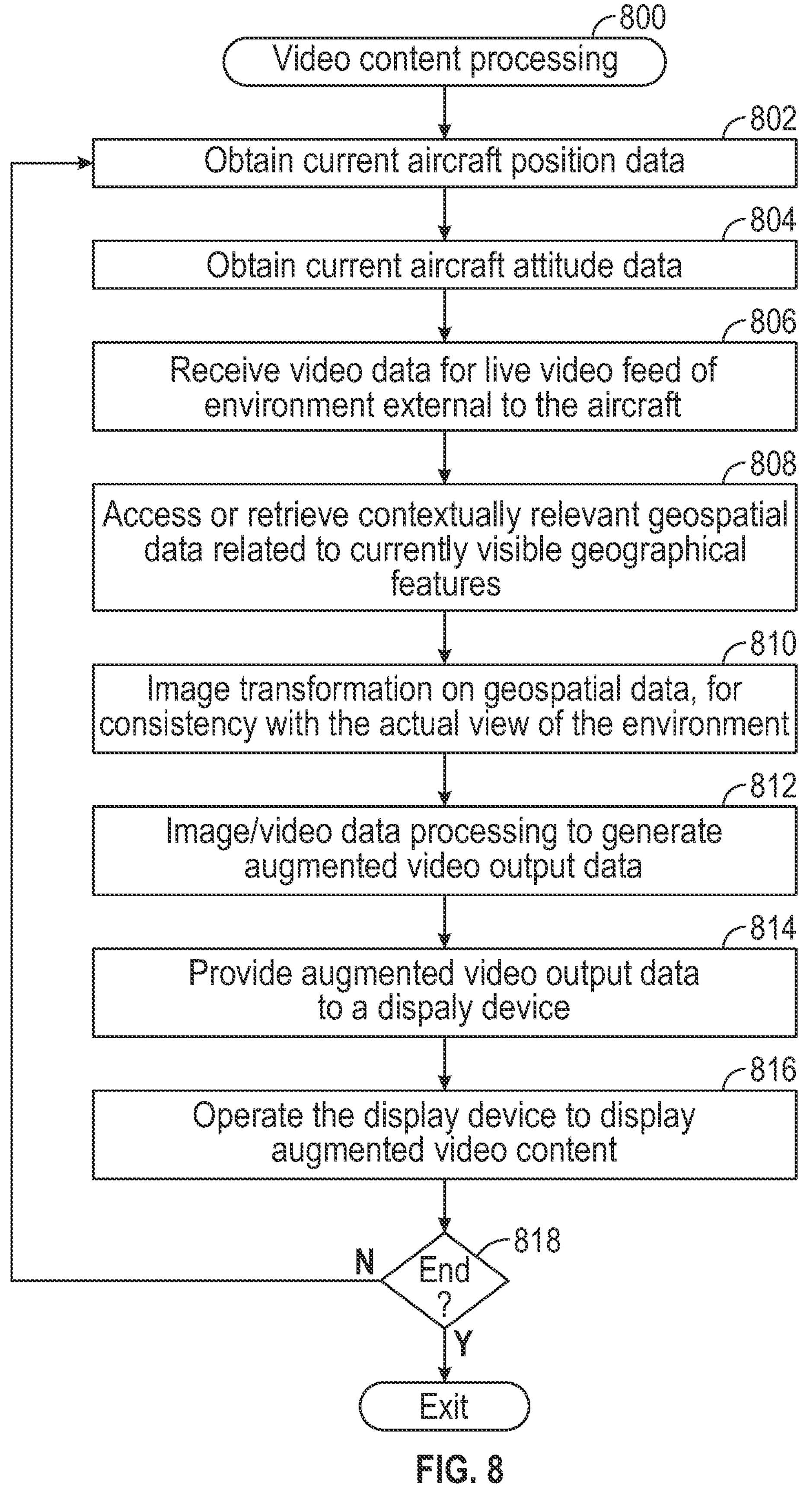
FIG. 8 is a flow diagram that illustrates an exemplary embodiment of a method of processing video content.

FIG. 8 is a flow diagram that illustrates an exemplary embodiment of a method of processing video content 800. The various tasks performed in connection with the method 800 may be performed by software, hardware, firmware, or any combination thereof. For illustrative purposes, the following description of the method 800 may refer to elements mentioned above in connection with FIGS. 1-3. In practice, portions of the method 800 may be performed by different elements of the described system, e.g., a camera 120, the avionics subsystem 202, a video processor 204, or the display device 206. It should be appreciated that the method 800 may include any number of additional or alternative tasks, the tasks shown in FIG. 8 need not be performed in the illustrated order, and the method 800 may be incorporated into a more comprehensive procedure or process having additional functionality not described in detail herein. Moreover, one or more of the tasks shown in FIG. 8 could be omitted from an embodiment of the disclosed method 800 as long as the intended overall functionality remains intact.

An iteration of the method 800 can be performed at any desired refresh rate (e.g., 30 frames per second) to process video content that is to be displayed onboard an aircraft during flight or during ground based operations. The illustrated embodiment of the method 800 obtains position data corresponding to the current geographical position of the host aircraft (task 802), and obtains attitude data corresponding to the current attitude of the host aircraft (task 804). The position data may include, for example, GPS data that indicates longitude, latitude, and altitude information. The attitude data may include sensor data that indicates pitch, roll, and yaw of the aircraft. The method 800 also accesses or receives video data for a live video feed corresponding to a view of the environment external to the host aircraft (task 806). As mentioned above, the video data can be captured and provided by a suitably arranged and oriented camera that is mounted to structure of the aircraft.

The method 800 may continue by accessing or retrieving contextually relevant geospatial data that is related to one or more currently visible geographical features (task 808). In this regard, the contextually relevant geographical features of interest appear in the live video feed captured by the camera. Accordingly, the method 800 can consider at least some of the position data and/or at least some of the attitude data to identify or designate the specific geospatial data that is processed by task 808. The method 800 may continue by performing image transformation on at least some of the retrieved/accessed geospatial data (task 810). The image transformation associated with task 810 results in transformed image content that corresponds to at least a portion of the geospatial data of interest. Task 810 is performed to manipulate or modify the original geospatial data for consistency with the actual view of the surrounding environment that is conveyed by the captured video content. For example, the image transformation processing can generate the transformed image content with visual alignment, orientation, perspective, and scale that are consistent with the actual view of the environment that is represented by the captured video data. In certain embodiments, the image transformation routine is based on the obtained position data (task 802) and the obtained attitude data (task 804). The image transformation routine may generate the transformed image content based on camera calibration data for the imaging system, as explained above with reference to FIG. 2.

The method 800 continues by performing additional image/video processing to generate augmented video output data corresponding to the original video data (task 812). More specifically, the method 800 processes the received video data with the transformed image content to generate the augmented video output data. As explained above, the augmented video output data is ultimately based on the original video data, the obtained aircraft position data, the obtained aircraft attitude data, the identified geospatial data, and any applicable camera calibration data. The generated augmented video output data is provided to at least one display device (task 814), which is operated to display augmented video content that corresponds to the augmented video output data (task 816). For the exemplary embodiment described here, at least one video processor 204 causes the presentation of the augmented video content on a display device onboard the host aircraft.

If the video presentation is terminated, a different camera view is selected, or the method 800 is otherwise caused to end (the "Yes" branch of query task 818), then the method 800 exits. Otherwise, the method 800 returns to task 802 such that the described routine can be repeated to refresh the augmented display. In this way, the augmented video content is updated and refreshed in an ongoing manner to maintain consistency with the live video feed from the camera.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft comprising:

an avionics subsystem to provide position data corresponding to current geographical position of the aircraft, and attitude data corresponding to current attitude of the aircraft;

an imaging system to capture video data corresponding to a live-action view of an environment external to the aircraft, wherein the imaging system is mounted to or integrated with external structure of the aircraft at a first location;

at least one video processor coupled to the avionics subsystem and the imaging system, the at least one video processor configured to process the video data captured by the imaging system into augmented video output data corresponding to the live-action view of the environment combined with supplemental image content, wherein the at least one video processor generates the augmented video output data based on the position data provided by the avionics subsystem, the attitude data provided by the avionics subsystem, calibration data that calibrates the live-action view from the first location to a second reference location on the aircraft, and geospatial data related to at least some geographical features in the live-action view of the environment;

wherein the at least one video processor generates the augmented video output data by performing image transformation on at least some of the geospatial data related to at least some geographical feature in the live-action view to obtain transformed image content that is based on the position data, the attitude data, and the calibration data for maintaining consistency between the first location and the second location; and a display device coupled to the at least one video processor to receive the augmented video output data including the transformed image content, the display device configured to display augmented video content corresponding to the received augmented video output data for shared viewing by a plurality of occupants of the aircraft.

2. The aircraft of claim 1, wherein:

the geospatial data comprises metadata;

the augmented video content includes visual content corresponding to at least some of the metadata; and the metadata comprises: data that identifies, describes, or characterizes a geographical feature that appears in the view of the environment; data that identifies, describes, or characterizes an architectural feature that appears in the view of the environment; data that identifies, describes, or characterizes weather associated with the view of the environment; data that identifies, describes, or characterizes religious information associated with the view of the environment; and/or data that identifies, describes, or characterizes a person, a sports team, an organization, a company, a business, an object, an entity, a geo-political boundary, a historically significant location, or a culturally significant location that appears in the view of the environment.

3. The aircraft of claim 1, wherein the imaging system comprises a camera mounted to or integrated with external structure of the aircraft.

4. The aircraft of claim 1, wherein the augmented video content comprises three dimensional graphical content corresponding to at least some of the geospatial data.

5. The aircraft of claim 1, wherein the augmented video content comprises graphical content corresponding to current operating status data of the aircraft.

6. The aircraft of claim 1, wherein the display device is disposed at the second location.

7. The aircraft of claim 1, wherein the second location is a fixed location on the aircraft.

8. The aircraft of claim 1, wherein the at least one video processor is configured to perform the image transformation by transforming alignment, orientation, perspective, and scale of the at least some geospatial data to be consistent with the at least some geographical feature.

9. A method of processing video content displayed onboard an aircraft during flight, the method comprising:

obtaining position data corresponding to current geographical position of the aircraft;

obtaining attitude data corresponding to current attitude of the aircraft;

receiving video data for a live video feed corresponding to a live-action view of an environment external to the aircraft, wherein the video data is captured by an imaging system mounted to or integrated with external structure of the aircraft at a first location;

processing the received video data into augmented video output data corresponding to the live-action view of the environment combined with supplemental image content, based on the obtained position data, the obtained attitude data, calibration data that calibrates the live-action view from the first location to a second reference location on the aircraft, and geospatial data related to at least some geographical features in the live-action view of the environment;

wherein processing the received video data into augmented video output data includes performing image transformation on at least some of the geospatial data related to at least some geographical feature in the live-action view to obtain transformed image content that is based on the obtained position data, the obtained attitude data, and the calibration data for maintaining consistency between the first location and the second location; and causing presentation of augmented video content with a display device onboard the aircraft for shared viewing by a plurality of occupants of the aircraft, wherein the augmented video content corresponds to the augmented video output data and the transformed image content.

10. The method of claim 9, wherein:

the geospatial data comprises metadata;

the augmented video content includes visual content corresponding to at least some of the metadata; and the metadata comprises: data that identifies, describes, or characterizes a geographical feature that appears in the view of the environment; data that identifies, describes, or characterizes an architectural feature that appears in the view of the environment; data that identifies, describes, or characterizes weather associated with the view of the environment; data that identifies, describes, or characterizes religious information associated with the view of the environment; and/or data that identifies, describes, or characterizes a person, a sports team, an organization, a company, a business, an object, an entity, a geo-political boundary, a historically significant location, or a culturally significant location that appears in the view of the environment.

11. The method of claim 9, wherein the augmented video content comprises three dimensional graphical content corresponding to at least some of the geospatial data.

12. The method of claim 9, wherein the augmented video content comprises graphical content corresponding to current operating status data of the aircraft.

13. The method of claim 9, wherein the display device is disposed at the second location.

14. The method of claim 9, wherein the second location is a fixed location on the aircraft.

15. The method of claim 9, wherein performing the image transformation includes transforming alignment, orientation, perspective, and scale of the at least some geospatial data to be consistent with the at least some geographical feature.

16. A system comprising:

at least one processor; and at least one processor-readable medium associated with the at least one processor, the at least one processor-readable medium storing processor-executable instructions configurable to be executed by the at least one processor to perform a method of processing video content for display onboard an aircraft during flight, the method comprising:

obtaining position data corresponding to current geographical position of the aircraft;

obtaining attitude data corresponding to current attitude of the aircraft;

receiving video data for a live video feed corresponding to a live-action view of an environment external to the aircraft, wherein the video data is captured by an imaging system mounted to or integrated with external structure of the aircraft at a first location;

processing the received video data into augmented video output data corresponding to the live-action view of the environment combined with supplemental image content, based on the obtained position data, the obtained attitude data, calibration data calibrating the live-action view from the first location to a second location on the aircraft, and geospatial data related to at least some geographical features in the live-action view of the environment;

wherein processing the received video data into augmented video output data includes performing image transformation on at least some of the geospatial data related to at least some geographical feature in the live-action view to obtain transformed image content that is based on the obtained position data, the obtained attitude data, and the calibration data for maintaining consistency between the first location and the second location; and causing presentation of augmented video content with a display device onboard the aircraft for shared viewing by a plurality of occupants of the aircraft, wherein the augmented video content corresponds to the augmented video output data and the transformed image content.

17. The system of claim 16, wherein:

the geospatial data comprises metadata;

the augmented video content includes visual content corresponding to at least some of the metadata; and the metadata comprises: data that identifies, describes, or characterizes a geographical feature that appears in the view of the environment; data that identifies, describes, or characterizes an architectural feature that appears in the view of the environment; data that identifies, describes, or characterizes weather associated with the view of the environment; data that identifies, describes, or characterizes religious information associated with the view of the environment; and/or data that identifies, describes, or characterizes a person, a sports team, an organization, a company, a business, an object, an entity, a geo-political boundary, a historically significant location, or a culturally significant location that appears in the view of the environment.

18. The system of claim 16, wherein the display device is disposed at the second location.

19. The system of claim 16, wherein the second location is a fixed location on the aircraft.

20. The system of claim 16, wherein performing the image transformation includes transforming alignment, orientation, perspective, and scale of the at least some geospatial data to be consistent with the at least some geographical feature.

* * * * *